United States Patent
Shin et al.

(10) Patent No.: US 11,929,519 B2
(45) Date of Patent: Mar. 12, 2024

(54) SEPARATOR INCLUDING COATING LAYER WITH ETHYLENICALLY UNSATURATED BINDER, AND SECONDARY BATTERY INCLUDING POLYMER NETWORK FORMED BY GEL POLYMER ELECTROLYTE AND ETHYLENICALLY UNSATURATED BINDER IN COATING LAYER OF SEPARATOR

(71) Applicant: LG CHEM, LTD., Seoul (KR)

(72) Inventors: Won Kyung Shin, Daejeon (KR); Kyoung Ho Ahn, Daejeon (KR); Chul Haeng Lee, Daejeon (KR); Jae Won Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 187 days.

(21) Appl. No.: 16/768,929

(22) PCT Filed: Jan. 17, 2019

(86) PCT No.: PCT/KR2019/000722
§ 371 (c)(1),
(2) Date: Jun. 2, 2020

(87) PCT Pub. No.: WO2019/143155
PCT Pub. Date: Jul. 25, 2019

(65) Prior Publication Data
US 2021/0175584 A1  Jun. 10, 2021

(30) Foreign Application Priority Data
Jan. 18, 2018 (KR) .................. 10-2018-0006795

(51) Int. Cl.
*H01M 50/446* (2021.01)
*C08F 120/12* (2006.01)
*C09D 101/02* (2006.01)
*C09D 127/16* (2006.01)
*C09D 171/02* (2006.01)
*C09D 179/08* (2006.01)
*H01M 10/0525* (2010.01)
*H01M 10/0565* (2010.01)
*H01M 50/417* (2021.01)
*H01M 50/42* (2021.01)
*H01M 50/426* (2021.01)
*H01M 50/449* (2021.01)
*H01M 50/451* (2021.01)
*H01M 50/454* (2021.01)

(52) U.S. Cl.
CPC ......... *H01M 50/446* (2021.01); *C08F 120/12* (2013.01); *C09D 101/02* (2013.01); *C09D 127/16* (2013.01); *C09D 171/02* (2013.01); *C09D 179/08* (2013.01); *H01M 10/0525* (2013.01); *H01M 10/0565* (2013.01); *H01M 50/42* (2021.01); *H01M 50/449* (2021.01); *H01M 50/451* (2021.01); *H01M 50/417* (2021.01); *H01M 50/426* (2021.01); *H01M 50/454* (2021.01); *H01M 2300/0082* (2013.01); *H01M 2300/0085* (2013.01)

(58) Field of Classification Search
CPC .. H01M 50/451; H01M 50/446; H01M 50/42; H01M 10/0525; H01M 10/0565
USPC ........................................ 429/144, 251, 254
See application file for complete search history.

(56) References Cited

U.S. PATENT DOCUMENTS

| | | | |
|---|---|---|---|
| 10,243,239 B1 | 3/2019 | Ahn et al. | |
| 10,270,073 B2 | 4/2019 | Hyun et al. | |
| 2005/0084764 A1* | 4/2005 | Lee .................. | H01M 10/0565 429/231.95 |
| 2010/0221965 A1 | 9/2010 | Katayama et al. | |
| 2011/0256456 A1* | 10/2011 | Jeon .................... | H01M 10/052 429/303 |
| 2014/0322586 A1 | 10/2014 | Lee et al. | |
| 2015/0072244 A1* | 3/2015 | Chen .................... | H01M 4/133 429/303 |
| 2015/0236318 A1 | 8/2015 | Katayama et al. | |
| 2015/0303427 A1 | 10/2015 | Hyun et al. | |
| 2016/0028113 A1 | 1/2016 | Jeon et al. | |
| 2016/0359155 A1 | 12/2016 | Hyun et al. | |
| 2017/0133654 A1 | 5/2017 | Cho et al. | |
| 2017/0170443 A1* | 6/2017 | Murakami .......... | H01M 50/417 |
| 2018/0102542 A1 | 4/2018 | Matsuzaki et al. | |

(Continued)

FOREIGN PATENT DOCUMENTS

| | | |
|---|---|---|
| CN | 101563808 A | 10/2009 |
| CN | 101796669 A | 8/2010 |

(Continued)

OTHER PUBLICATIONS

Guerre et al., One-pot synthesis of poly(vinylidene fluoride) methacrylate macromonomers via thia-Michael addition, 2016, Polymer Chemistry, 7, 441-450 (Year: 2016).*
Apostolides et al., Near-Model Amphiphilic Polymer Conetworks Based on Four-Arm Stars of Poly(vinylidene fluoride) and Poly(ethylene glycol): Synthesis and Characterization, 2018, Macromolecules, 51, 2476-2488 (Year: 2018).*
Yoo et al., "Lithium-ion polymer cells assembled with a reactive composite separator containing vinyl-functionalized SiO2 particles," Journal of Power Sources, 295 (2015) 149-155.

(Continued)

*Primary Examiner* — Sean P Cullen
(74) *Attorney, Agent, or Firm* — Morgan, Lewis & Bockius LLP

(57) ABSTRACT

The present invention relates to a separator for a secondary battery, the separator including a substrate and a coating layer formed on the surface of the substrate, wherein the coating layer includes an organic binder and inorganic particles, and the organic binder contains an ethylenically unsaturated group, and to a lithium secondary battery including the same.

13 Claims, No Drawings

(56) References Cited

U.S. PATENT DOCUMENTS

| | | | |
|---|---|---|---|
| 2018/0212219 A1 | 7/2018 | Kim et al. | |
| 2018/0358626 A1* | 12/2018 | Nagasawa | H01M 4/133 |
| 2019/0011088 A1 | 1/2019 | Kim | |
| 2019/0198837 A1* | 6/2019 | Yushin | H01M 50/494 |

FOREIGN PATENT DOCUMENTS

| | | | | | |
|---|---|---|---|---|---|
| CN | 103474697 A | | 12/2013 | | |
| CN | 104205415 A | | 12/2014 | | |
| CN | 105932203 A | * | 9/2016 | | C08F 259/08 |
| CN | 106797048 A | | 5/2017 | | |
| EP | 3203565 A1 | | 8/2017 | | |
| JP | 2007-173196 A | | 7/2007 | | |
| JP | 2015-529947 A | | 10/2015 | | |
| JP | 2015-225791 A | | 12/2015 | | |
| JP | 2016-072231 A | | 5/2016 | | |
| JP | 2017-050149 A | | 3/2017 | | |
| JP | 2017130323 A | * | 7/2017 | | C08F 214/22 |
| KR | 10-2002-0080797 A | | 10/2002 | | |
| KR | 10-2006-0042326 A | | 5/2006 | | |
| KR | 2006055140 A | * | 5/2006 | | H01M 10/052 |
| KR | 10-2012-0108686 A | | 10/2012 | | |
| KR | 10-2015-0099648 A | | 9/2015 | | |
| KR | 10-2015-0131513 A | | 11/2015 | | |
| KR | 10-2015-0143178 A | | 12/2015 | | |
| KR | 2015143178 A | * | 12/2015 | | |
| KR | 10-2016-0040128 A | | 4/2016 | | |
| KR | 2017025434 A | * | 3/2017 | | H01M 10/052 |
| KR | 10-2017-0140253 A | | 12/2017 | | |
| WO | WO-2006052082 A1 | * | 5/2006 | | H01M 10/052 |
| WO | WO-2016031466 A1 | * | 3/2016 | | B32B 27/08 |
| WO | 2017/039109 A1 | | 3/2017 | | |
| WO | 2017039198 A1 | | 3/2017 | | |

OTHER PUBLICATIONS

Shin et al., "Hybrid Composite Membranes Based on Polyethylene Separator and Al2O3 Nanoparticles for Lithium-Ion Batteries," Journal of Nanoscience and Nanotechnology, vol. 13, pp. 3705-3710 (2013).

International Search Report (with partial transation) and Written Opinion dated May 24, 2019, issued in corresponding International Patent Application No. PCT/KR2019/000722.

Extended European Search Report issued from the European Patent Office dated Nov. 19, 2020 in a corresponding European Patent Application No. 19741257.0.

Nagata, "Industrial Synthetic Method of the Rubbers 3. Styrene Butadiene Rubber," Journal of the Society of Rubber Science and Technology, Japan, 2015, vol. 88, No. 8, p. 323-328.

Tosoh, Analysis and Research Center, "[Technical Data] Composition Analysis (NMR) or Styrene-Butadiene Copolymer (SBR)," Technical Report: No. T1916, Dec. 24, 2019.

Ji-Hyun Yoo et al., "Lithium-ion polymer cells assembled with a reactive composite separator containing vinyl-functionalized SiO2 particles," Journal of Power Sources, 295, 2015, pp. 149-155.

* cited by examiner

SEPARATOR INCLUDING COATING LAYER WITH ETHYLENICALLY UNSATURATED BINDER, AND SECONDARY BATTERY INCLUDING POLYMER NETWORK FORMED BY GEL POLYMER ELECTROLYTE AND ETHYLENICALLY UNSATURATED BINDER IN COATING LAYER OF SEPARATOR

CROSS-REFERENCE TO RELATED APPLICATIONS

This application claims the benefit of Korean Patent Application No. 10-2018-0006795, filed on Jan. 18, 2018, in the Korean Intellectual Property Office, the disclosure of which is incorporated herein in its entirety by reference.

TECHNICAL FIELD

Technical Field

The present invention relates to a separator for a secondary battery and a lithium secondary battery including the same, and more particularly, to a separator for a secondary battery capable of improving the performance and safety of the lithium secondary battery, and a lithium secondary battery including the same.

Background Art

As technology development and demand for mobile devices have increased, the demand for secondary batteries as an energy source has been rapidly increased. Among such secondary batteries, lithium secondary batteries having high energy density and operating potential, long cycle life, and low self-discharging rate have been commercialized and widely used.

In recent years, due to the growing interest in environmental issues, there have been many studies conducted on electric vehicles (EV) and hybrid electric vehicles (HEV) which can replace vehicles that use fossil fuels, such as gasoline vehicles and diesel vehicles, which are one of the main causes of air pollution.

Such electric vehicles (EV), hybrid electric vehicles (HEV), and the like use, as a power source thereof, a nickel metal hydride (Ni-MH) secondary battery, or a lithium secondary battery of high energy density, high discharge voltage and output stability. When the lithium secondary battery is used in an electric vehicle, significantly superior energy density, safety and long-term life properties to those of a conventional small lithium secondary battery are inevitably required in addition to high energy density and properties capable of producing a large output in a short time, since the battery must be used for more than 10 years under harsh conditions.

In general, a lithium secondary battery is manufactured by using a positive electrode, a negative electrode, a separator interposed therebetween, and an electrolyte which is a transfer medium of lithium ions.

Among those, the separator is an inert material that does not participate in an electrochemical reaction. However, the separator provides a path through which lithium ion moves such that a battery is operated, and is a material that separates the physical contact between the anode and the cathode. The separator is one of the key materials that has a significant impact on the performance and stability of the battery.

Methods for preparing a separator are categorized into a wet type and a dry type. The wet-type preparation method is a method in which a polymer material and low molecular weight wax are mixed to extrude a film at a high temperature, and using a solvent, the wax is extracted to form a micro-porous structure. The dry-type preparation method is a method in which, only by physical stretching and heat treatment without using wax, pores are formed in a multi-layered structure in which two or three layers of films are bonded by using polyethylene (PE) and polypropylene (PP).

Meanwhile, the lithium secondary battery may be easily heated due to kinetic energy generated while charging/discharging is repeated, and the separator is vulnerable to such heat. Particularly, a separator using polyethylene (PE) begins to melt at about 130° C., which may cause a 'shut-down' phenomenon in which pores are closed, and completely melts at 150° C. or higher, which may cause melt-down since internal short circuit is not prevented.

In order to overcome such limitations, in recent years, studies have been conducted to enhance durability, such as using a dip coating method in which inorganic particles and a polymer binder are coated on the surface of a separator.

Meanwhile, in a typical secondary battery, a liquid electrolyte, particularly, an ionic conductive organic liquid electrolyte in which a salt is dissolved in a non-aqueous organic solvent has been mainly used.

However, when a liquid electrolyte is used as described above, there are significant possibilities in that an electrode material is degenerated and an organic solvent is volatilized. In addition, there are safety issues such as combustion due to the temperature rise in a battery itself and the surroundings thereof. In particular, the lithium secondary battery has a problem in that the thickness of a battery is increased, during charging/discharging, due to the generation of gas inside the battery caused by the decomposition of a carbonate organic solvent and/or a side reaction between the organic solvent and an electrode. As a result, the deterioration in the performance and safety of the battery is inevitable.

In general, it is known that the safety of a battery is increased in the order of liquid electrolyte<gel polymer electrolyte<solid polymer electrolyte, whereas the performance of the battery is decreased. The solid polymer electrolyte has been known to have low battery performance, and thus, is not commercially available.

On the other hand, the gel polymer electrolyte is excellent in electrochemical safety, and thus is capable of maintaining the thickness of a battery constant, and due to adhesion inherent in the gel, the adhesion between an electrode and the electrolyte is excellent, so that a thin-film battery may be manufactured. Therefore, a gel polymer electrolyte has been widely used in recent years.

However, when a separator having a coating layer including a gel polymer electrolyte and inorganic particles is used, the adhesion between the coating layer and the electrolyte is low, so that the stability and performance of a secondary battery are deteriorated.

Therefore, it is necessary to develop a separator for lithium secondary battery, the separator having excellent adhesion to a gel polymer electrolyte while having excellent durability, such that safety, capacity properties, and lifespan properties of a battery may be improved.

(Patent Document 1) Korean Patent Laid-Open Publication No. 10-2015-0131513

DISCLOSURE OF THE INVENTION

Technical Problem

An aspect of the present invention provides a separator capable of increasing the adhesion to a gel polymer electrolyte, thereby improving the output properties and safety of a battery, and a lithium secondary battery including the same.

Technical Solution

According to an aspect of the present invention, there is provided a separator for a secondary battery, the separator including a substrate and a coating layer formed on the surface of the substrate, wherein the coating layer includes an organic binder and inorganic particles, and the organic binder contains an ethylenically unsaturated group.

At this time, the ethylenically unsaturated group may be at least one selected from the group consisting of a vinyl group, an acryloxy group and a methacryloxy group.

According to another aspect of the present invention, there is provided a lithium secondary battery including a positive electrode, a negative electrode, and a gel polymer electrolyte disposed between the positive electrode and the negative electrode and the separator and formed by polymerizing an oligomer containing a (meth) acrylate group, wherein a polymer network in a three-dimensional structure is formed by a polymerization reaction between the organic binder included in the separator and containing an ethylenically unsaturated group and the oligomer containing a (meth) acrylate group.

Advantageous Effects

A separator according to the present invention includes an organic binder containing an ethylenically unsaturated group in a coating layer, such that the organic binder of the coating layer of the separator and an oligomer included in a gel polymer electrolyte composition are subjected to a polymerization reaction to improve the adhesion between the separator and a gel polymer electrolyte, thereby improving the performance and safety of a lithium secondary battery.

BEST MODE FOR CARRYING OUT THE INVENTION

Hereinafter, the present invention will be described in more detail.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Meanwhile, unless otherwise specified in the present invention, "*" refers to a portion connected between ends of the same or different atoms or chemical formulas.

In the present specification, weight average molecular weight may refer to a conversion value for a standard polystyrene measured by Gel Permeation Chromatography (GPC), and unless otherwise specified, molecular weight may refer to the weight average molecular weight. At this time, the weight average molecular weight may be measured by Gel Permeation Chromatography (GPC). For example, a sample specimen of a predetermined concentration is prepared, and a GPC measurement system Alliance 4 device is stabilized. When the device is stabilized, a standard specimen and the sample specimen are injected into the device to obtain a chromatogram, and weight average molecular weight is calculated according to an analysis method (System: Alliance 4, Column: Ultrahydrogel linear×2, Eluent: 0.1 M $NaNO_3$, pH 7.0 phosphate buffer, Flow rate: 0.1 mL/min, Temp: 40° C., Injection: 100 μL).

Separator for Secondary Battery

A separator for a secondary battery according to the present invention includes a substrate and a coating layer formed on the surface of the substrate, wherein the coating layer includes an organic binder and inorganic particles, and the organic binder contains an ethylenically unsaturated group.

The thickness of the separator may be 0.1 to 20 μm, preferably 0.5 to 20 μm, more preferably 1.0 to 20 μm. When the thickness of the separator is in the above range, resistance in a battery is prevented from being increased and the movement of lithium ions may be maintained facilitated. Therefore, it is desirable that the thickness of the separator is in the above range.

The substrate may be a porous substrate, and any porous substrate may be used without particular limitation as long as it is usable as a separator material of an electrochemical device. Examples of such porous substrate may include a non-woven fabric or a porous polymer film formed of at least one of polymer resins such as polyolefin, polyethylene, polyethylene terephthalate, polybutylene terephthalate, polyacetal, polyamide, polycarbonate, polyimide, polyetheretherketone, polyethersulfone, poloxylene oxide, polyphenylenesulfide, and polyethylene naphthalene, or a laminate of two or more thereof, but are not particularly limited thereto.

The coating layer is to enhance the durability of a separator substrate and is formed on the surface of the substrate and includes an organic binder and inorganic particles. At this time, the organic binder includes an ethylenically unsaturated group.

Typically, in order to improve the durability and conductivity of a separator, inorganic particles and the like have been coated on the surface of a substrate and used. However, the inorganic particles are not reactive with an electrolyte, so that the adhesion between the electrolyte and the separator is deteriorated, and there are safety issues in that the internal short circuit of a battery is induced and the like.

The separator according to the present invention has a coating layer using inorganic particles and an organic binder together, and the organic binder contains an ethylenically unsaturated group. The organic binder including an ethylenically unsaturated group may be subjected to a radical polymerization with an oligomer included in a composition for a gel polymer electrolyte.

More specifically, the composition for a gel polymer electrolyte may include an oligomer containing a (meth) acrylate group, and the functional group is a functional group which may be subjected to a radical polymerization reaction with the ethylenically unsaturated group contained in organic binder. Therefore, the oligomer and the organic binder may be coupled through a radical polymerization reaction during a curing process of the composition for a gel polymer electrolyte and form a polymer network in a three-dimensional structure, thereby improving the adhesion between the separator and the gel polymer electrolyte. At this time, when the adhesion between the separator and the gel polymer electrolyte is improved, the internal resistance of a battery is reduced and lithium ion transfer properties are improved. Therefore, the output properties and lifespan properties of the battery may be improved.

Also, when the adhesion between the separator and the gel polymer electrolyte is improved, the mechanical strength of a secondary battery is improved, so that the internal short circuit of a battery is prevented even under external shock, and thermal runaway or ignition is prevented, so that the safety of the battery may be also improved.

The organic binder contains an ethylenically unsaturated group. For example, the ethylenically unsaturated group may include at least one selected from the group consisting of a vinyl group, an acryloxy group and a methacryloxy group.

Meanwhile, the organic binder may further include a unit including at least one selected from the group consisting of an alkylene group having at least one of halogen elements thereof (F, Cl, Br, I) substituted, an alkylene oxide group, an alkylene oxide group having at least one of halogen elements thereof (F, Cl, Br, I) substituted, an imide group, and celluloid.

At this time, the ethylenically unsaturated group may be positioned at an end portion of a polymer main chain or at a side portion of a polymer main chain composed of the units, and the number or position of functional groups attached is not specified.

For example, a unit containing an alkylene group having at least one of the halogen elements substituted may be represented by at least one selected from the units represented by Formulas X-1 and X-2 below.

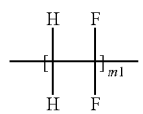

[Formula X-1]

In Formula X-1, the m1 is an integer of 1 to 100.

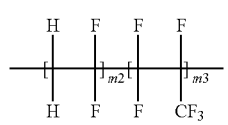

[Formula X-2]

In Formula X-2, the m2 and the m3 are each independently an integer of 1 to 100.

For example, a unit containing an alkylene oxide group may be represented by the following Formula X-3.

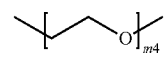

[Formula X-3]

In Formula X-3, the m4 is an integer of 1 to 100.

For example, a unit containing an alkylene oxide group which is substituted with the halogen element may be represented by the following Formula X-4.

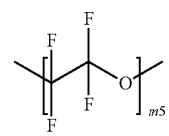

[Formula X-4]

In Formula X-4, the m5 is an integer of 1 to 100.

For example, a unit containing the imide group may be represented by the following Formula X-5.

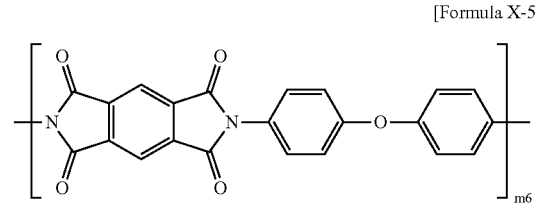

[Formula X-5]

For example, a unit containing the celluloid may be represented by the following Formula X-6.

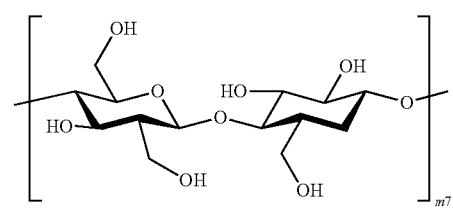

[Formula X-6]

In Formula X-6, the m7 is an integer of 1 to 100.

Specifically, a compound used as the organic binder is a compound having an ethylenically unsaturated group substituted at an end portion of a polymer main chain or a side portion of the polymer main chain formed of at least one unit selected from the group consisting of Formulas X-1 to X-6.

For example, a polymer or a copolymer including the units represented by Formulas X-1 to X-6 is usually formed by a free radical polymerization reaction or the like. At this time, at the end of the polymerization reaction, a functional group, a hydroxyl group, an alkyl oxide group, and an alkyl group or the like including a halogen element is attached to an end portion or a side portion of a main chain constituting a polymer or a copolymer by performing end-capping such that no more polymerization reaction occurs.

For example, when an end portion is processed with a functional group including a halogen element, a halogen compound such as sodium chloride (NaCl) may be used as an end-capping agent. However, the present invention is not limited to the above method, and the type of an end-capping agent is not also limited to the above material.

Specifically, when a functional group and the like including a halogen element is positioned at the end portion or the side portion, the functional group may be reacted with a (meth) acrylate compound or a vinyl compound. By the reaction, an organic binder having the halogen element with an ethylenically unsaturated group such as a (meth) acryloxy group or a vinyl group may be prepared.

The organic binder may be included in an amount of 1 part by weight to 80 parts by weight, preferably 5 parts by weight to 60 parts by weight, more preferably 5 parts by weight to 40 parts by weight based on 100 parts by weight of the coating layer. When the organic binder is included in the above range, the de-intercalation of the inorganic particles included in the coating layer may be prevented, and a separator for a secondary battery the mechanical properties of which are improved may be provided.

The inorganic particles form an interstitial volume between the particles, and thus form pores of a micro unit, and at the same time, serves as a kind of spacer capable of maintaining a physical shape. Also, the inorganic particles may transfer and move lithium ions, and thus may improve lithium ion conductivity. At this time, pores of a micro unit may be formed by controlling the size and content of the inorganic particles and the composition of the inorganic particles and a polymer. Also, the size and porosity of the pores may be controlled.

The inorganic particles may be inorganic particles typically used in the art. For example, the inorganic particles may include at least one element selected from the group consisting of Si, Al, Ti, Zr, Sn, Ce, Mg, Ca, Zn, Y, Pb, Ba, Hf, and Sr, and preferably, may include at least one element selected from the group consisting of Si, Al, Ti, and Zr.

More specifically, examples of the inorganic particle may include $SiO_2$, $Al_2O_3$, $TiO_2$, $ZrO_2$, $SnO_2$, $CeO_2$, MgO, CaO, ZnO, $Y_2O_3$, $Pb(Zr,Ti)O_3$ (PZT), $Pb_{(1-a1)}La_{a1}Zr_{(1-b1)}Ti_{b1}O_3$ ($0 \leq a1 \leq 1$, $0 \leq b1 \leq 1$, PLZT), $PB(Mg_3Nb_{2/3})O_3$—$PbTiO_3$ (PMN-PT), $BaTiO_3$, $HfO_2$ (hafnia), $SrTiO_3$, and the like, and the inorganic materials listed above are characterized in that the physical properties thereof do not change even at a high temperature of 200° C. or higher. More preferably, the inorganic particle may include at least one inorganic material selected from the group consisting of $SiO_2$, $Al_2O_3$, $TiO_2$, and $ZrO_2$.

The inorganic particles may be included in an amount of 20 part by weight to 99 parts by weight, preferably 40 parts by weight to 95 parts by weight, more preferably 60 parts by weight to 90 parts by weight based on 100 parts by weight of the coating layer. When the inorganic particles are included in the above range, the de-intercalation of the inorganic particles from the coating layer may be prevented, and the durability of the separator for a secondary battery may be improved.

<Manufacturing of Lithium Secondary Battery>

Next, a lithium secondary battery according to the present invention will be described. A lithium secondary battery according to yet another embodiment of the present invention includes a positive electrode, a negative electrode, a separator interposed between the positive electrode and the negative electrode and including a coating layer, and a gel polymer electrolyte disposed between the positive electrode and the negative electrode and the separator.

The positive electrode may be prepared by coating a positive electrode active material slurry including a positive electrode active material, a binder, a conductive agent, and a solvent on a positive electrode current collector.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used.

The positive electrode active material is a compound capable of reversible intercalation and de-intercalation of lithium, and specifically, may include a lithium composite metal oxide containing one or more metals such as cobalt, manganese, nickel or aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (wherein $0<Y1<1$), $LiMn_{2-Z1}Ni_{Z1}O_4$ (wherein $0<Z1<2$), etc.), a lithium-nickel-cobalt-based oxide (e.g., $LiNi_{1-Y2}CoY_2O_2$ (wherein $0<Y2<1$), etc.), a lithium-manganese-cobalt-based oxide (e.g., $LiCo_{1-Y3}Mn_{Y3}O_2$ (wherein $0<Y3<1$), $LiMn_{2-Z2}Co_{Z2}O_4$ (wherein $0<Z2<2$), etc.), a lithium-nickel-manganese-cobalt-based oxide (e.g., $Li(Ni_{p1}Co_{q1}Mn_{r1})O_2$ (wherein $0<p1<1$, $0<q1<1$, $0<r1<1$, $p1+q1+r1=1$) or $Li(Ni_{p2}Co_{q2}Mn_{r2})O_4$ (wherein $0<p2<2$, $0<q2<2$, $0<r2<2$, $p2+q2+r2=2$), etc.), or a lithium-nickel-cobalt-transition metal (M) oxide (e.g., $Li(Ni_{p3}Co_{q3}Mn_{r3}M_{s1})O_2$ (wherein M is selected from the group consisting of Al, Fe, V, Cr, Ti, Ta, Mg, and Mo, and p3, q3, r3, and s1 are each an atomic fraction of independent elements, and $0<p3<1$, $0<q3<1$, $0<r3<1$, $0<s1<1$, $p3+q3+r3+s1=1$), etc.) and the like, and any one thereof or a compound of two or more thereof may be included.

Among these, due to the fact that the capacity properties and stability of a battery may be increased, the lithium composite metal oxide may be $LiCoO_2$, $LiMnO_2$, $LiNiO_2$, a lithium nickel-manganese-cobalt oxide (e.g., $Li(Ni_{1/3}Co_{1/3}Mn_{1/3})O_2$, Li $(Ni_{0.6}Mn_{0.2}Co_{0.2})$ $O_2$, Li $(Ni_{0.5}Mn_{0.3}Co_{0.2})$ $O_2$, or Li $(Ni_{0.8}Mn_{0.1}Co_{0.1})$ $O_2$, etc.), or a lithium nickel cobalt aluminum oxide (e.g., $LiNi_{0.8}Co_{0.15}Al_{0.05}O_2$, etc.), and the like. When considering an remarkable improvement effect according to the control of type and content ratio of constituent elements forming a lithium composite metal oxide, the lithium composite metal oxide may be Li $(Ni_{0.6}Mn_{0.2}Co_{0.2})O_2$, Li $(Ni_{0.5}Mn_{0.3}Co_{0.2})$ $O_2$, Li $(Ni_{0.7}Mn_{0.15}Co_{0.15})O_2$, or Li $(Ni_{0.8}Mn_{0.1}Co_{0.1})O_2$, and the like, and any one thereof or a mixture of two or more thereof may be used.

The positive electrode active material may be included in an amount of 60 wt % to 98 wt %, preferably 70 wt % to 98 wt %, more preferably 80 wt % to 98 wt % based on the total weight of a solid excluding the solvent from the positive electrode active material slurry.

The binder is a component for assisting in coupling between an active material and a conductive agent, and coupling to a current collector. Specifically, examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene (PE), polypropylene, an ethylene-propylene-diene monomer (EPDM), a sulfonated EPDM, styrene-butadiene rubber, nitrile-butadiene rubber, fluorine rubber, various copolymers thereof, and the like. Typically, the binder may be included in an amount of 1 wt % to 20 wt %, preferably 1 wt % to 15 wt %, more preferably 1 wt % to 10 wt % based on the total weight of a solid excluding the solvent from the positive electrode active material slurry.

The conductive agent is a component for further improving the conductivity of a positive electrode active material. The conductive agent is not particularly limited as long as it has conductivity without causing a chemical change in the battery. Examples of the conductive agent may include graphite; a carbon-based material such as carbon black, acetylene black, Ketjen® black, channel black, furnace black, lamp black, and thermal black; a conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like. Specific examples of a commercially available conductive material may include acetylene black series of Chevron Chemical Company, Denka® Black of Denka Singapore Private Limited, Gulf Oil Company, etc., Ketjen® black and EC series of Armak Company, Vulcan® XC-72 of Cabot Company, and Super P® of Timcal Company. The conductive agent may be included in an amount of 1 wt % to 20 wt %, preferably 1 wt % to 15 wt %, more preferably 1 wt % to 10 wt % based on the total weight of a solid excluding the solvent from the positive electrode active material slurry.

The solvent may include an organic solvent such as N-methyl-2-pyrrolidone (NMP), and may be used in an amount such that a preferred viscosity is achieved when the positive electrode active material, and selectively, the binder and the conductive agent, and the like are included. For example, the solvent may be included in an amount such that the concentration of a solid including the positive electrode active material, and selectively the binder and the conductive agent is 50 wt % to 95 wt %, preferably 70 wt % to 95 wt %, more preferably 70 wt % to 90 wt %.

Also, the negative electrode may be prepared by coating a negative electrode active material slurry including a negative electrode active material, a binder, a conductive agent, and a solvent on a negative electrode current collector.

The negative electrode current collector typically has a thickness of 3-500 μm. The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, as in the case of the positive electrode current collector, microscopic irregularities may be formed on the surface of the negative electrode current collector to improve the coupling force of a negative electrode active material, and the negative electrode current collector may be used in various forms of such as a film, a sheet, a foil, a net, a porous body, a foam body, and a non-woven fabric body.

Examples of the negative electrode active material may include one or two or more kinds of negative active materials selected from the group consisting of natural graphite, artificial graphite, a carbonaceous material; a metal (Me) such as a lithium-containing titanium composite oxide (LTO), Si, Sn, Li, Zn, Mg, Cd, Ce, Ni or Fe; an alloy composed of the metals (Me); an oxide ($MeO_x$) of the metal (Me); and a composite of the metal (Me) and carbon.

The negative electrode active material may be included in an amount of 60 wt % to 98 wt %, preferably 70 wt % to 98 wt %, more preferably 80 wt % to 98 wt % based on the total weight of a solid excluding the solvent from the negative electrode active material slurry.

The descriptions of the binder, conductive agent, and solvent are the same as those described above, and thus, detailed descriptions thereof will be omitted.

The separator is interposed between the positive electrode and the negative electrode and includes a coating layer including an organic binder and inorganic particles. The coating layer is positioned on a surface facing a gel polymer electrolyte. The descriptions of the coating layer and the electrolyte are the same as those as described above, and thus detailed descriptions thereof will be omitted.

The gel polymer electrolyte is disposed between the positive electrode and the negative electrode and the separator and formed by polymerizing an oligomer containing a (meth) acrylate group. When the oligomer containing a (meth) acrylate group is used, a radical polymerization reaction with the organic binder containing the ethylenically unsaturated group included in the coating layer occurs to form a polymer network of a three-dimensional structure.

For example, the oligomer may further include an oxyalkylene group. Specifically, the oligomer may be represented by Formula 1 below.

$$A\text{-}C_1\text{-}A' \quad \text{[Formula 1]}$$

In Formula 1, the A and A' are each independently a unit containing a (meth) acrylate group, and the $C_1$ is a unit containing an oxyalkylene group.

Specifically, the units A and A' are each a unit including a (meth) acrylate group such that an oligomer may be polymerized to form a polymer. When the (meth) acrylate group is included, a polymerization reaction with the organic binder containing the ethylenically unsaturated group occurs to form a polymer network. The units A and A' may be derived from a monomer including monofunctional or polyfunctional (meth) acrylate or (meth) acrylic acid.

For example, the units A and A' may each independently contain at least one of the units represented by Formula A-1 to Formula A-5 below.

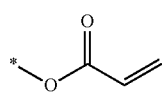
[Formula A-1]

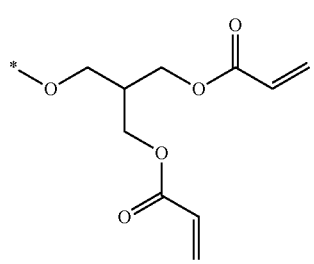
[Formula A-2]

[Formula A-3]

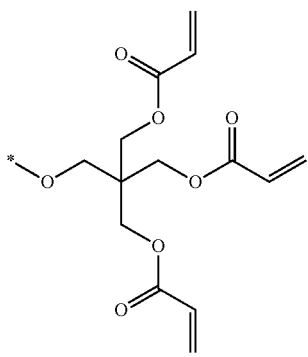

[Formula A-4]

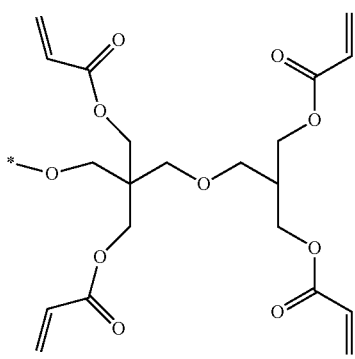

[Formula A-5]

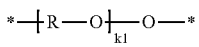

The unit $C_1$ may include a unit represented by Formula $C_1$-1.

[Formula $C_1$-1]

In Formula $C_1$-1, R is a substituted or unsubstituted linear-type or branched-type alkylene group having 1 to 10 carbon atoms, and k1 is an integer of 1 to 30.

In another example, in Formula $C_1$-1, the R may be independently —$CH_2CH_2$— or —$CHCH_3CH_2$—.

For example, according to one embodiment of the present invention, an oligomer forming a polymer network may be at least one compound selected from the group consisting of consisting of Formula 1-1 to Formula 1-5 below.

[Formula 1-1]

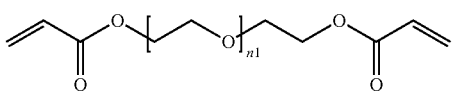

In Formula 1-1, the n1 is an integer of 1 to 20,000.

[Formula 1-2]

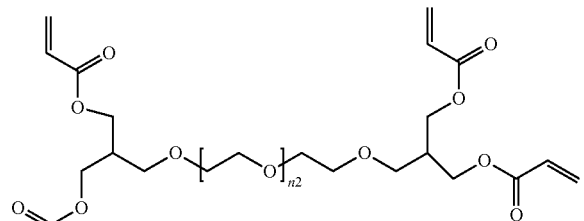

In Formula 1-2, the n2 is an integer of 1 to 20,000.

[Formula 1-3]

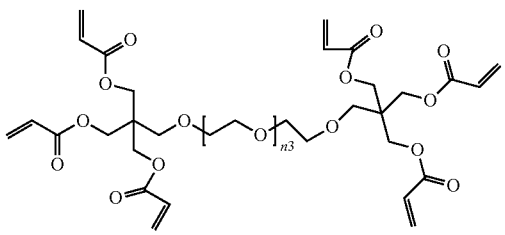

In Formula 1-3, the n3 is an integer of 1 to 20,000.

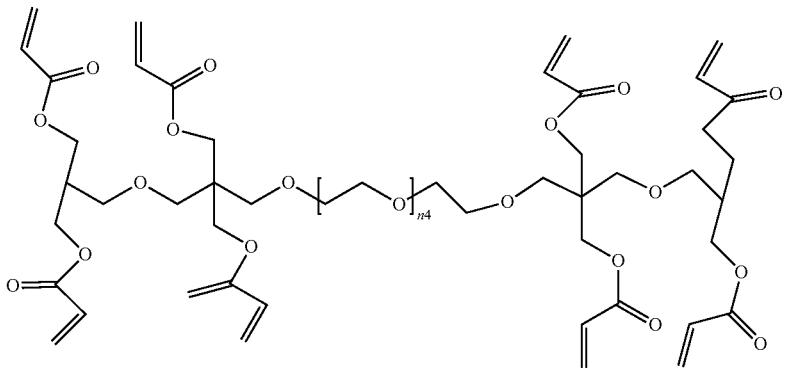

[Formula 1-4]

In Formula 1-4, the n4 is an integer of 1 to 20,000.

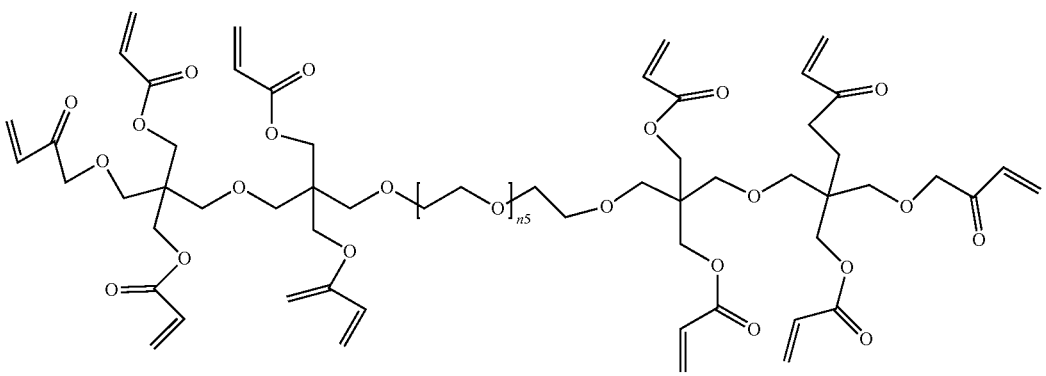

[Formula 1-5]

In Formula 1-5, the n5 is an integer of 1 to 20,000.

In Formula 1-1 to Formula 1-5, the n1 to n5 are each independently an integer of 1 to 20,000, preferably an integer of 1 to 10,000, and more preferably an integer of 1 to 5,000.

In another example, the oligomer may be represented by Formula 2 below.

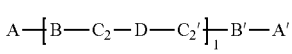

[Formula 2]

In Formula 2, the A and A' are each independently a unit containing a (meth) acrylate group, which are the same as described above, the B and B' are each independently a unit containing an amide group, the $C_2$ and $C_2'$ are each independently a unit containing an oxyalkylene group, the D is a unit containing a siloxane group, and 1 is an integer of 1 to 200.

Meanwhile, the l may be preferably an integer of 10 to 200, more preferably 20 to 200. When the l is in the above range, while the mechanical properties of a polymer formed by the oligomer are high, the fluidity thereof is maintained above a predetermined level, so that the polymer may be uniformly dispersed inside a battery.

In addition, the B and B' are each independently a unit containing an amide group, which control ion transfer properties and impart mechanical properties in implementing a polymer electrolyte.

For example, the B and B' may each independently include a unit represented by Formula B-1 below.

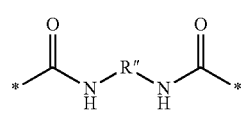

[Formula B-1]

In Formula B-1, R' is at least one selected from the group consisting of a linear or non-linear alkylene group having 1 to 10 carbon atoms, a substituted or unsubstituted cycloalkylene group having 3 to 10 carbon atoms, a substituted or unsubstituted bicycloalkylene group having 6 to 20 carbon atoms, a substituted or unsubstituted arylene group having 6 to 20 carbon atoms, a unit represented by Formula R"-1 below, and a unit represented by Formula R"-2 below.

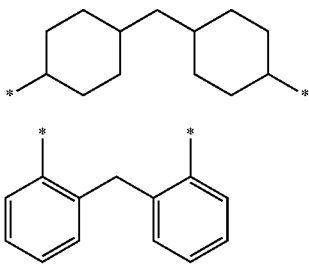
[Formula R″-1]

[Formula R″-2]

In another example, in Formula B-1,
the R″ may include at least one of the units represented by Formulas R″-3 to R″-8 below.

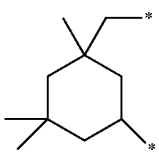
[Formula R″-3]

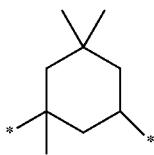
[Formula R″-4]

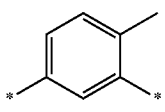
[Formula R″-5]

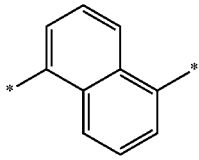
[Formula R″-6]

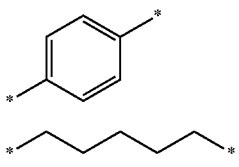
[Formula R″-7]

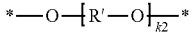
[Formula R″-8]

Also, in implementing the polymer electrolyte of the present invention, the units $C_2$ and $C_2'$ are each independently a unit containing an oxyalkylene group. The units $C_2$ and $C_2'$ are used to control the dissociation and ion transport capacity of the salt in the polymer network.

For example, the $C_2$ and $C_2'$ may each independently include a unit represented by Formula $C_2$-1 below.

*—O—[R′—O]$_{k2}$—*    [Formula $C_2$-1]

In Formula $C_2$-1, R′ is a substituted or unsubstituted linear-type or branched-type alkylene group having 1 to 10 carbon atoms, and k2 is an integer of 1 to 30.

In another example, in Formula $C_2$-1, the R′ may be —$CH_2CH_2$— or —$CHCH_3CH_2$—.

Also, the unit D contains a siloxane group and is to control mechanical properties and the affinity with the separator. Specifically, a structure for securing the flexibility in a region other than the region of a rigid structure due to an amide bond may be formed in the polymer network.

For example, the unit D may include a unit represented by Formula D-1.

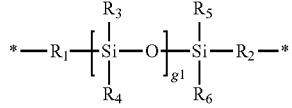
[Formula D-1]

In Formula D-1, $R_1$ and $R_2$ are linear or non-linear alkylene groups having 1 to 5 carbon atoms, $R_3$, $R_4$, $R_5$, and $R_6$ are each independently hydrogen, an alkyl group having 1 to 5 carbon atoms, or an aryl group having 6 to 12 carbon atoms, and g1 is an integer of 1 to 400.

Meanwhile, the g1 may be preferably an integer of 1 to 300, more preferably 1 to 200.

In another example, the unit D may include a unit represented by Formula D-2 below.

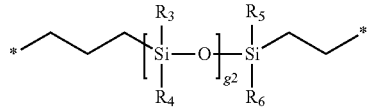
[Formula D-2]

In Formula D-2, $R_3$, $R_4$, $R_5$, and $R_6$ are each independently hydrogen, an alkyl group having 1 to 5 carbon atoms, or an aryl group having 6 to 12 carbon atoms, and g2 may be an integer of 1 to 400, preferably an integer of 1 to 300, more preferably an integer of 1 to 200.

More specifically, the D-1 may be at least one selected from the units represented by Formulas D-3 and D-4 below.

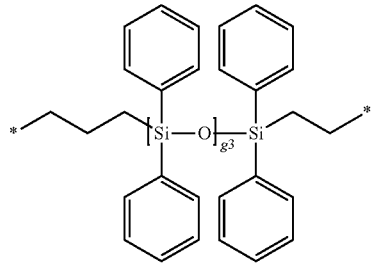
[Formula D-3]

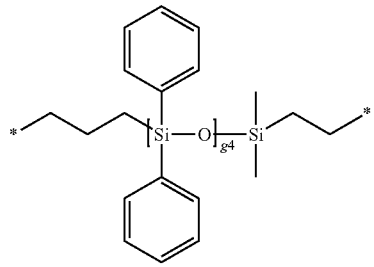
[Formula D-4]

In Formulas D-3 and D-4, the g3 and the g4 may be each independently an integer of 1 to 400, preferably an integer of 1 to 300, and more preferably an integer of 1 to 200.

For example, according to one embodiment of the present invention, the oligomer forming a polymer network may be at least one compound selected from the group consisting of the compounds represented by Formulas 2-1 to 2-5 below.

[Formula 2-1]

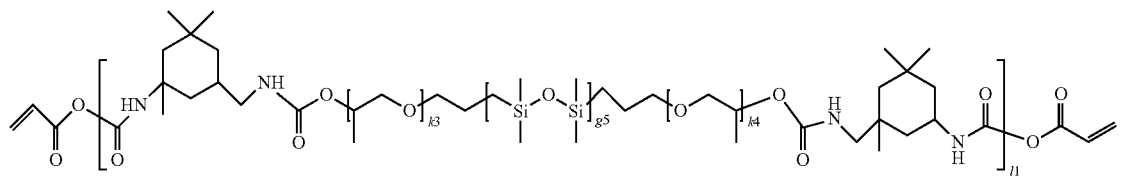

In Formula 2-1, the k3 and the k4 are each independently an integer of 1 to 30, and the g5 is an integer of 1 to 400. The l1 is an integer of 1 to 200.

[Formula 2-2]

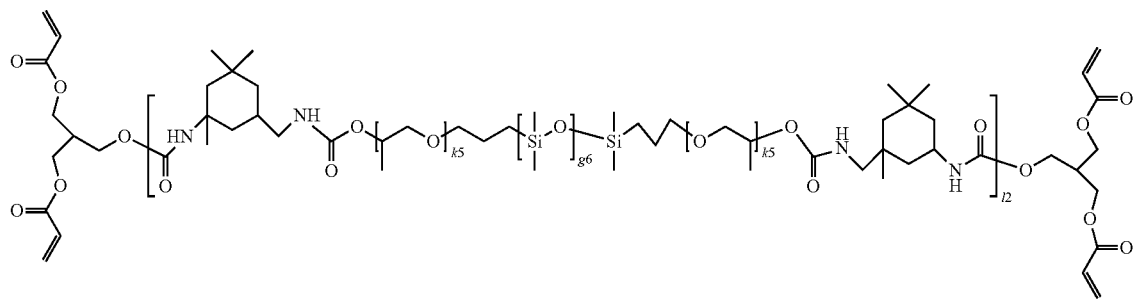

In Formula 2-2, the k5 and the k6 are each independently an integer of 1 to 30, and the g6 is an integer of 1 to 400. The l2 is an integer of 1 to 200.

[Formula 2-3]

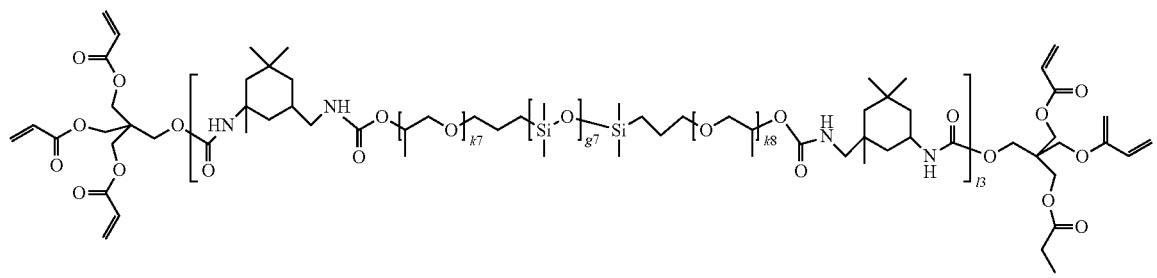

In Formula 2-3, the k7 and the k8 are each independently an integer of 1 to 30, and the g7 is an integer of 1 to 400. The l3 is an integer of 1 to 200.

[Formula 2-4]

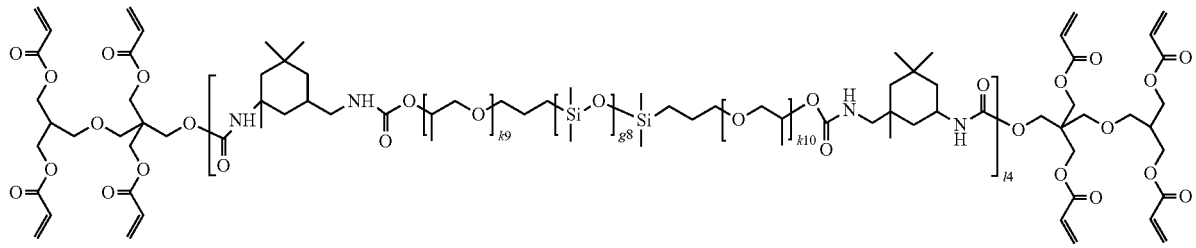

In Formula 2-4, the k9 and the k10 are each independently an integer of 1 to 30, and the g8 is an integer of 1 to 400. The l4 is an integer of 1 to 200.

[Formula 2-5]

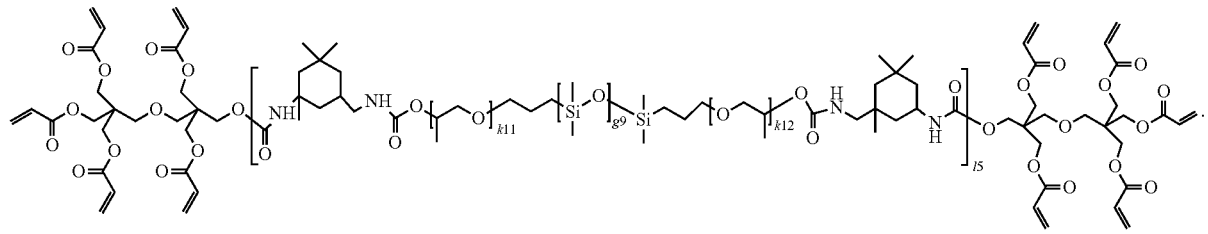

In Formula 2-5, the k11 and the k12 are each independently an integer of 1 to 30, and the g9 is an integer of 1 to 400. The l5 is an integer of 1 to 200.

Meanwhile, in Formulas 2-1 to 2-5, the l1 to the l5 may be preferably each independently an integer of 1 to 200, more preferably an integer of 1 to 150. When the l1 to the l5 are in the above range, while the mechanical properties of a polymer formed by the oligomer are high, the fluidity thereof is maintained above a predetermined level, so that the polymer may be uniformly dispersed inside a battery.

Also, the oligomer of the present invention may have a weight average molecular weight of about 1,000 to about 100,000. When the weight average molecular weight of the oligomer is in the above range, the mechanical strength of a battery including the same may be effectively improved.

Meanwhile, the gel polymer electrolyte is preferably formed by injecting a gel polymer electrolyte composition including the oligomer into a battery case and then curing the composition.

More specifically, a secondary battery according to the present invention may be manufactured by (a) inserting an electrode assembly composed of a positive electrode, a negative electrode, and a separator interposed between the positive electrode and the negative electrode into a battery case, and (b) injecting into the battery case the composition for gel polymer electrolyte according to the present invention, followed by polymerizing to form a gel polymer electrolyte.

At this time, the polymerization reaction may be performed by E-BEAM, gamma ray, a room temperature/high-temperature aging process.

Also, various battery cases used in the art may be used as the battery case without limitation. For example, a battery case of a cylindrical shape, a square shape, a pouch shape, a coin shape, or the like may be used.

Meanwhile, the composition for gel polymer electrolyte may include a lithium salt, a non-aqueous organic solvent, and a polymerization initiator in addition to the oligomer.

Any lithium salt may be used without particular limitation as long as it is typically used in an electrolyte for a lithium secondary battery. For example, the lithium salt may include $Li^+$ as positive ions, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as negative ions. The lithium salt may include a single material or a mixture of two or more materials, when needed. The content of the lithium salt may be appropriately changed within a range that is typically usable. However, in order to obtain an optimum effect of forming an anti-corrosive coating on the surface of an electrode, the lithium salt may be included in the electrolyte at a concentration of 0.8 M to 2 M, specifically 0.8 M to 1.5 M. However, the content of the lithium salt is not limited to the above range, and the lithium salt may be included at a high concentration of 2 M or higher depending on other components in the composition for gel polymer electrolyte.

Any non-aqueous organic solvents typically used in an electrolyte for lithium secondary battery may be used without limitation as the non-aqueous organic solvent. For example, an ether compound, an ester compound, an amide compound, a linear carbonate compound, or a cyclic carbonate compound may be used alone or in combination of two or more thereof Among the above, typical examples may include a cyclic carbonate compound, a linear carbonate compound, or a mixture thereof.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof. Also, specific examples of the linear carbonate compound may include any one selected from the group consisting of dimethyl carbonate (DMC), diethyl carbonate (DEC), dipropyl carbonate, ethyl methyl carbonate (EMC), methyl propyl carbonate, and ethyl propyl carbonate, or a mixture of two or more thereof, but are not limited thereto.

Specifically, among the carbonate-based organic solvents, a cyclic carbonate such as ethylene carbonate and propylene carbonate which are organic solvents having high viscosity and high dielectric constant, thereby dissociating a lithium salt in an electrolyte well, may be used. When a linear carbonate such as dimethyl carbonate and diethyl carbonate having low viscosity and low dielectric constant is mixed with such cyclic carbonate in an appropriate ratio and used, an electrolyte having high electrical conductivity may be prepared.

Also, among the non-aqueous organic solvents, the ether compound may be any one selected from the group consisting of dimethyl ether, diethyl ether, dipropyl ether, methyl ethyl ether, methyl propyl ether, and ethyl propyl ether, or a mixture of two or more thereof, but is not limited thereto.

Also, among the non-aqueous organic solvents, the ester compound may be any one selected from the group consisting linear esters such as methyl acetate, ethyl acetate, propyl acetate, methyl propionate, ethyl propionate, propyl propionate, and butyl propionate; and cyclic esters such as γ-butyrolactone, γ-valerolactone, γ-caprolactone, σ-valerolactone, and ε-caprolactone, or a mixture of two or more thereof, but is not limited thereto.

The polymerization initiator is decomposed by heat, a non-limiting example thereof may be 30° C. to 100° C., specifically 60° C. to 80° C., in a battery, or decomposed at room temperature (5° C. to 30° C.) to form a radical. The oligomer may be reacted by a free radical polymerization reaction through the radical to form the gel polymer electrolyte.

The polymerization initiator may be any typical polymerization initiator known in the art, and may be at least one selected from the group consisting of an azo-based compound, a peroxide-based compound, or a mixture thereof.

For example, the polymerization initiator may be an organic peroxide or a hydroperoxide such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, or at least one azo compound selected from the group consisting of 2,2'-azobis (2-cyanobutane), dimethyl 2,2'-azobis (2-methylpropionate), 2,2'-azobis (methylbutyronitrile), 2,2'-azobis (isobutyronitrile) (AIBN), and 2,2'-azobisdimethyl-valeronitrile (AMVN), but is not limited thereto.

The polymerization initiator may be included in an amount of 0.1 wt % to 5 wt % based on the total weight of the oligomer. When the polymerization initiator is included in an amount greater than 5 wt %, the unreacted polymerization initiator may remain when preparing a gel polymer electrolyte to adversely affect the performance of a battery. On the other hand, when the polymerization initiator is included in an amount less than 0.01 wt %, gelation may not be achieved even under a condition above a predetermined temperature.

According to another embodiment of the present invention, a battery module including the lithium secondary battery as a unit cell and a battery pack including the same are provided. The battery module and the battery pack include the lithium secondary battery having high capacity, high rate properties, and cycle properties, and thus may be used as a power source of a medium-and-large sized device selected from the group consisting of an electric vehicle, a hybrid electric vehicle, a plug-in hybrid electric vehicle, and a power storage system.

MODE FOR CARRYING OUT THE INVENTION

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

EXAMPLES

1. Example 1

(1) Preparing Organic Binder

In a nitrogen atmosphere, vinylidene fluoride (VDF) as a monomer, diisopropyl peroxydicarbonate as a free radical initiator, and 1,1,2-trichlorotrifluoroethane as a solvent were introduced into a reactor cooled to −15° C. Thereafter, while maintaining 45° C. to initiate polymerization, a polymerization reaction was performed by stirring the reactant at 200 rpm to polymerize a compound in which a unit represented by Formula X-1 is repeated. 10 hours later, NaCl was introduced to terminate the polymerization reaction by substituting Cl at an end of the polymerized compound, and monomers not involved in the polymerization reaction were discharged.

The polymerized compound was dispersed in N-methylpyrrole as a solvent, and then acryl acid was introduced thereto at a molar ratio of 1:1.1 based on the polymerized compound, and stirred 200 rpm in the presence of NaOH while maintaining 45° C. 10 hours later, a drying process was performed at 120° C. to obtain an organic binder having Cl at the end thereof substituted with an acryloxy group.

(2) Preparing Separator for Lithium Secondary Battery

A coating layer composition was prepared by adding 27 g of an aluminum oxide ($Al_2O_3$) as inorganic particles and 3 g of the organic binder of Example 1 in 72.1 ml of N-methylpyrrole.

The coating layer composition was applied on a polyethylene substrate having a thickness of 10 μm, and then dried to prepare a separator (total thickness=20 μm) for a lithium secondary battery, the separator having a coating layer of a thickness of 10 μm.

2. Example 2

In a nitrogen atmosphere, vinylidene fluoride (VDF) and hexafluoropropylene (HFP) mixed at a weight ratio of 7:3 to be used as a monomer, diisopropyl peroxydicarbonate as a free radical initiator, and 1,1,2-trichlorotrifluoroethane as a solvent were introduced into a reactor cooled to −15° C. Thereafter, while maintaining 45° C. to initiate polymerization, a polymerization reaction was performed by stirring the reactant at 200 rpm such that a unit represented by Formula X-2 is repeated. 10 hours later, NaCl was introduced to terminate the polymerization reaction by substituting Cl at an end of the polymerized compound, and monomers not involved in the polymerization reaction were discharged.

The polymerized compound was dispersed in N-methylpyrrole as a solvent, and then acryl acid was introduced thereto at a molar ratio of 1:1.1 based on the polymerized compound, and stirred 200 rpm in the presence of NaOH while maintaining 45° C. 10 hours later, a drying process was performed at 120° C. to obtain an organic binder having Cl at the end thereof substituted with an acryloxy group.

A separator for lithium secondary battery was prepared in the same manner as in Example 1 except that the organic binder prepared according to Example 2 was used.

Comparative Example

Comparative Example 1

A polyethylene substrate without a coating layer was used as a separator for lithium secondary battery.

Comparative Example 2

A separator for lithium secondary battery was prepared in the same manner as in Example 2 except that a polyvinylidene fluoride-hexafluoropropylene copolymer (PvDF-co-HFP) (weight average molecular weight=100,000) which is not substituted with an acryloxy group is used as the organic binder.

[Manufacturing Example] Manufacturing of Lithium Secondary Battery 94 wt % of $Li(Ni_{1/3}Co_{1/3}Mn_{1/3})O_2$ as a positive electrode active material, 3 wt % of carbon black as a conductive agent, and 3 wt % of polyvinylidene fluoride (PVDF) as a binder were added to N-methyl-2-pyrrolidone (NMP) as a solvent to prepare a positive electrode active material slurry. The positive electrode active material slurry was applied to an aluminum (Al) thin film having a thickness of about 20 μm, which is a positive electrode current collector, dried and then roll pressed to manufacture a positive electrode.

96 wt % of carbon powder as a negative electrode active material, 3 wt % of PVDF as a binder, and 1 wt % of carbon black as a conductive agent were added to NMP as a solvent to prepare a negative electrode active material slurry. The negative electrode active material was applied to a copper (Cu) thin film having a thickness of about 10 μm, which is a negative electrode current collector, dried and then roll pressed to manufacture a negative electrode.

A battery was assembled using the positive electrode, the negative electrode and the separator according to Examples 1 and 2 and Comparative Examples 1 and 2.

94.99 g of an organic solvent in which 1 M of $LiPF_6$ is dissolved in ethylene carbonate (EC):ethyl methyl carbonate (EMC)=3:7 (volume ratio) was added with 5 g of a compound (n1=3) represented by Formula 1-1 and 0.01 g of dimethyl 2,2'-azobis (2-methylpropionate) (CAS No. 2589-57-3), which is a polymerization initiator, to prepare a gel polymer electrolyte composition.

The gel polymer electrolyte composition was introduced into the assembled battery, and the electrode assembly was stored for 2 days at room temperature, and then heated for 5 hours at 65° C. to manufacture a lithium secondary battery.

Experimental Example

1. Experimental Example 1: Initial Capacity Measurement Test

The lithium secondary batteries manufactured in Examples 1 and 2 and the lithium secondary batteries manufactured in Comparative Examples 1 and 2 were respectively subjected to a formation process at a current of 100 mA (0.1 C rate). Thereafter, 4.2 V, 333 mA (0.3 C, 0.05 C cut-off) CC/CV charge and 3 V, 333 mA (0.3 C) CC discharge were repeated three times, and the third discharge capacity was defined as the initial capacity. The results are shown in Table 1 below.

TABLE 1

|  | Initial capacity (mAh) |
| --- | --- |
| Example 1 | 1027 ± 5 |
| Example 2 | 1018 ± 5 |
| Comparative Example 1 | 985 ± 5 |
| Comparative Example 2 | 1002 ± 5 |

Referring to Table 1, the lithium secondary batteries of Examples 1 and 2 have high adhesion between the gel polymer electrolyte and the separator, so that higher initial capacity may be obtained at high voltages.

Meanwhile, as shown in Table 1, the lithium secondary batteries of Comparative Examples 1 and 2 have lower adhesion between the electrolyte and the separator when compared with the lithium secondary batteries of Examples 1 and 2 and lack interface properties, so that the initial capacity thereof is relatively low.

2. Experimental Example 2: Cycle (Lifespan) Measurement

The lithium secondary batteries manufactured in Examples 1 and 2 and the lithium secondary batteries manufactured in Comparative Examples 1 and 2 were respectively subjected to a formation process at a current of 100 mA (0.1 C rate). Thereafter, 4.2 V, 333 mA (0.3 C, 0.05 C cut-off) CC/CV charge and 3 V, 333 mA (0.3 C) CC discharge were repeated 100 times, and the capacity retention rate was measured by comparing the 100th discharge capacity with the initial capacity. The results are shown in Table 2 below.

TABLE 2

|  | Capacity retention rate (%) after 100th cycle (%) |
| --- | --- |
| Example 1 | 93 ± 2 |
| Example 2 | 94 ± 2 |

TABLE 2-continued

| | Capacity retention rate (%) after 100th cycle (%) |
|---|---|
| Comparative Example 1 | 88 ± 2 |
| Comparative Example 2 | 90 ± 2 |

Referring to Table 2, the lithium secondary batteries of Examples 1 and 2 have excellent interface adhesion between the gel polymer electrolyte and the separator and an excellent gel polymer electrolyte distribution, so that an additional deterioration reaction of the electrolyte is suppressed, resulting in the improvement of cycle life.

Meanwhile, as shown in Table 2, the lithium secondary batteries of Comparative Examples 1 and 2 have lower adhesion between the electrolyte and the separator when compared with the lithium secondary batteries of Examples 1 to 2 and lack interface properties, so that additional deterioration of the electrolyte occurs, resulting in the decrease in capacity retention rate after a cycle.

3. Experimental Example 3: Nail Penetration Test

Each of the fully-charged lithium secondary batteries manufactured in Examples 1 and 2 and Comparative Examples 1 and 2 was penetrated with a metal nail having a diameter of 2.5 mm at a rate of 600 mm/min to perform a safety evaluation test of the secondary battery by means of mechanical shock and internal short circuit.

At this time, internal short circuit of the lithium secondary battery occurs due to the metal nail, causing the battery to be heated. At this time, the higher the heat generation temperature, the higher the likelihood of ignition, so that the safety is determined to be low. Also, when such heat generation leads to ignition, the safety of the secondary battery is determined to be very low. The test results are shown in Table 3 below.

TABLE 3

| | Heat generation temperature (° C.) | Ignition or no ignition Number of cells ignited/total number of cells tested |
|---|---|---|
| Example 1 | 60 | 1 / 5 |
| Example 2 | 60 | 1 / 5 |
| Comparative Example 1 | 100 | 4 / 5 |
| Comparative Example 2 | 95 | 4 / 5 |

As shown in Table 3, the lithium secondary batteries of Examples 1 and 2 have a lower heat generation temperature of about 60° C. when compared to those of Comparative Examples. On the other hand, the lithium secondary batteries of Comparative Examples 1 and 2 have a higher heat generation temperature of 100° C. and 95° C., respectively, so that it can be confirmed that the safety was deteriorated. Also, even when the safety was evaluated based on the number of cells ignited, it can be seen that the lithium secondary batteries Examples 1 to 2 are safer.

The invention claimed is:

1. A lithium secondary battery comprising:
   a positive electrode;
   a negative electrode;
   a separator; and
   a gel polymer electrolyte disposed between the positive electrode and the negative electrode and the separator, comprising a polymer of an oligomer containing a (meth)acrylate group,
   wherein the separator, comprises:
   a substrate; and
   a coating layer formed on a surface of the substrate, wherein
   the coating layer includes an organic binder and inorganic particles,
   the organic binder comprises an ethylenically unsaturated group positioned at an end portion or a side portion of a polymer including at least one unit selected from the group consisting of Formula X-1 and Formula X-2, and
   the separator comprises a polymer network in a three-dimensional structure of a polymer of the organic binder containing the ethylenically unsaturated group and the oligomer containing a (meth)acrylate group:

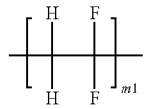

[Formula X-1]

wherein, in Formula X-1, m1 is an integer of 1 to 100,

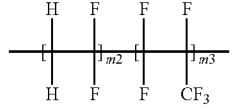

[Formula X-2]

wherein, in Formula X-2, m2 and m3 are each independently an integer of 1 to 100.

2. The secondary battery of claim 1, wherein the gel polymer electrolyte is formed by injecting a gel polymer electrolyte composition including the oligomer into a battery case and then curing the composition.

3. The secondary battery of claim 1, wherein the ethylenically unsaturated group is at least one selected from the group consisting of a vinyl group, an acryloxy group and a methacryloxy group.

4. The secondary battery of claim 1, wherein the organic binder is included in an amount of 1 part by weight to 80 parts by weight based on 100 parts by weight of the coating layer.

5. The secondary battery of claim 1, wherein the oligomer further contains an oxyalkylene group.

6. The secondary battery of claim 1, wherein the oligomer is represented by Formula 1 below:

$$A\text{-}C_1\text{-}A'$$ [Formula 1]

wherein, in Formula 1, A and A' are each independently a unit containing the (meth)acrylate group, and $C_1$ is a unit containing an oxyalkylene group.

7. The secondary battery of claim 1, wherein the oligomer comprises at least one compound selected from the group consisting of the compounds represented by Formula 1-1 to Formula 1-5 below:

[Formula 1-1]
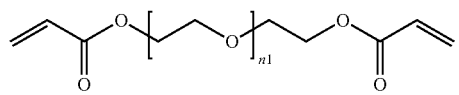
wherein, in Formula 1-1, n1 is an integer of 1 to 20,000,
[Formula 1-2]
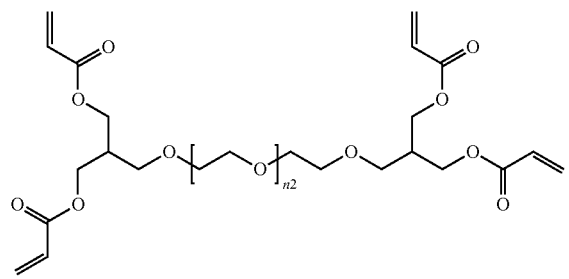
wherein, in Formula 1-2, n2 is an integer of 1 to 20,000,
[Formula 1-3]
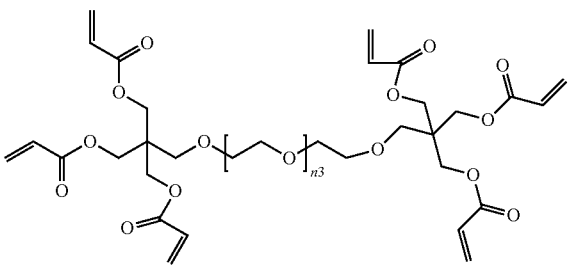
wherein, in Formula 1-3, n3 is an integer of 1 to 20,000,
[Formula 1-4]
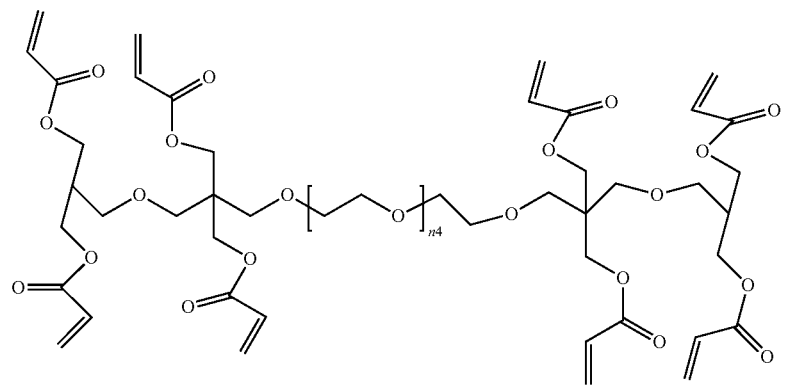
wherein, in Formula 1-4, n4 is an integer of 1 to 20,000,
[Formula 1-5]
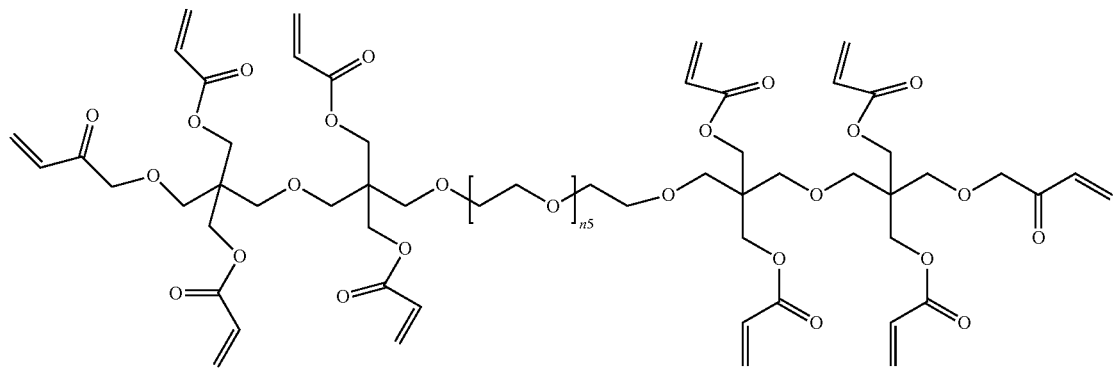
wherein, in Formula 1-5, n5 is an integer of 1 to 20,000.

8. The secondary battery of claim 1, wherein the oligomer comprises a compound represented by Formula 1-1:

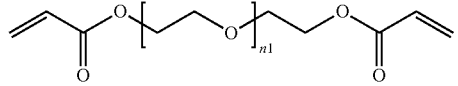

[Formula 1-1]

wherein, in Formula 1-1, n1 is an integer of 1 to 20,000.

9. The secondary battery of claim 1, wherein the oligomer comprises a compound represented by Formula 1-2:

[Formula 1-2]

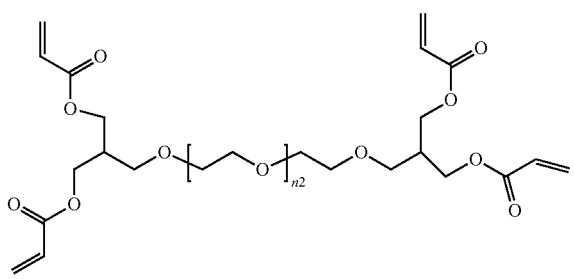

wherein, in Formula 1-2, n2 is an integer of 1 to 20,000.

10. The secondary battery of claim 1, wherein the oligomer comprises a compound represented by Formula 1-3:

[Formula 1-3]

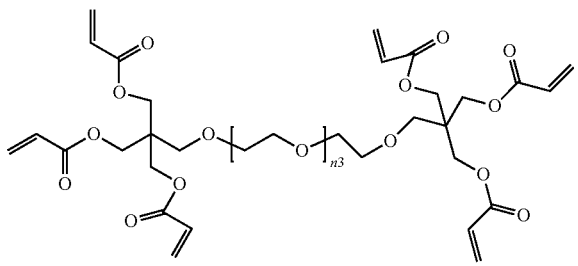

wherein, in Formula 1-3, n3 is an integer of 1 to 20,000.

11. The secondary battery of claim 1, wherein the oligomer comprises a compound represented by Formula 1-4:

[Formula 1-4]

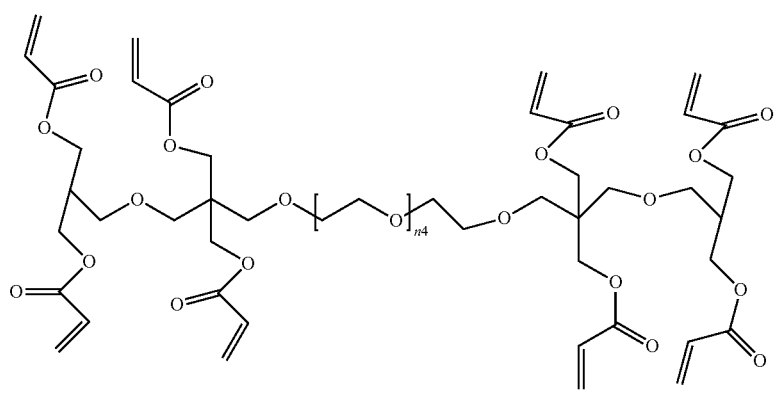

wherein, in Formula 1-4, n4 is an integer of 1 to 20,000.

12. The secondary battery of claim 1, wherein the oligomer is represented by Formula 2 below:

[Formula 2]

$$A \!\!-\!\!\!\left[\!B\!-\!C_2\!-\!D\!-\!C_2{'}\right]_{\!l}\!\!-\!\!B'\!-\!A'$$

wherein, in Formula 2, A and A' are each independently a unit containing the (meth)acrylate group, B and B' are each independently a unit containing an amide group, $C_2$ and $C_2{'}$ are each independently a unit containing an oxyalkylene group, D is a unit containing a siloxane group, and l is an integer of 1 to 200.

13. The secondary battery of claim 1, wherein the oligomer comprises at least one compound selected from the group consisting of the compounds represented by Formula 2-1 to Formula 2-5 below:

[Formula 2-1]
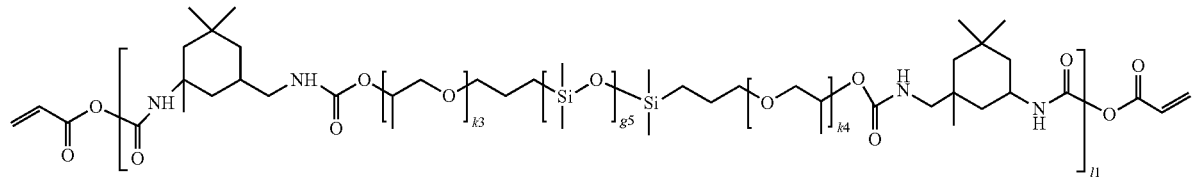
wherein, in Formula 2-1, k3 and k4 are each independently an integer of 1 to 30, g5 is an integer of 1 to 400, and l1 is an integer of 1 to 400,
[Formula 2-2]
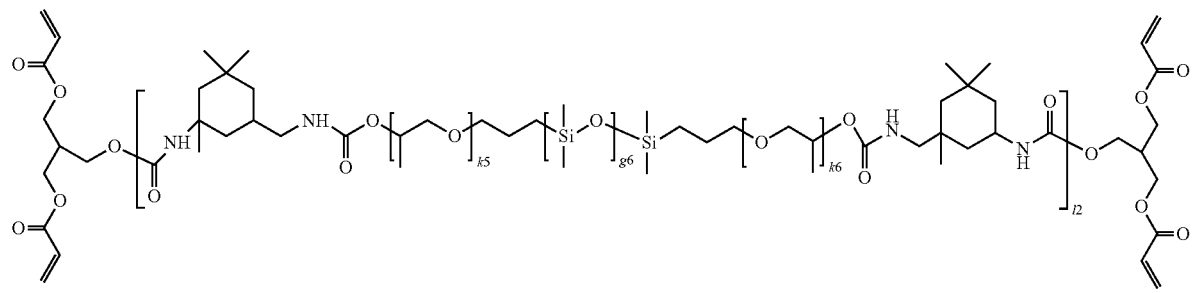
wherein, in Formula 2-2, k5 and k6 are each independently an integer of 1 to 30, g6 is an integer of 1 to 200, and l2 is an integer of 1 to 200,
[Formula 2-3]
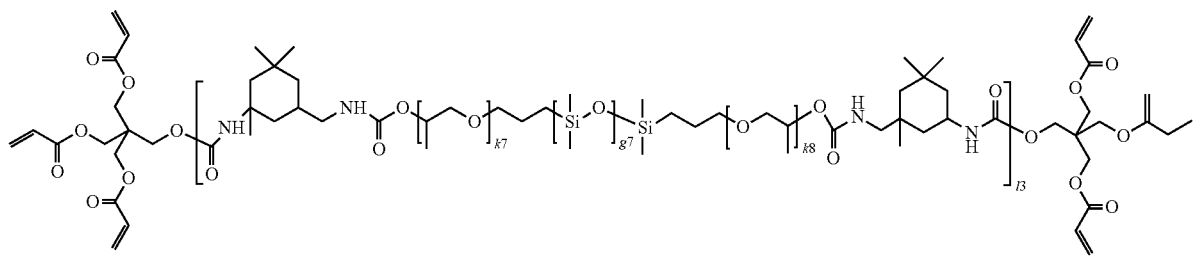
wherein, in Formula 2-3, k7 and k8 are each independently an integer of 1 to 30, g7 is an integer of 1 to 400, and l3 is an integer of 1 to 200,
[Formula 2-4]
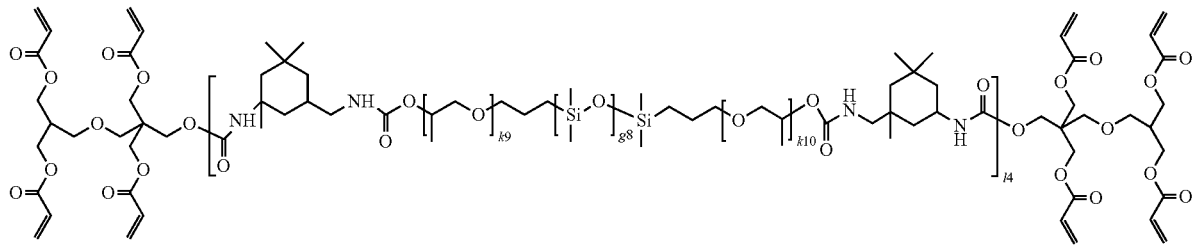

wherein, in Formula 2-4, k9 and k10 are each independently an integer of 1 to 30, g8 is an integer of 1 to 400, and 14 is an integer of 1 to 200,
[Formula 2-5]
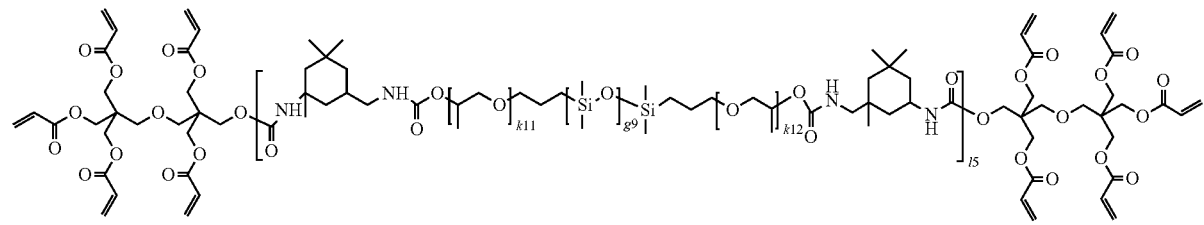
wherein, in Formula 2-5, k11 and k12 are each independently an integer of 1 to 30, g9 is an integer of 1 to 400, and 15 is an integer of 1 to 200.
* * * * *